Figure 1:
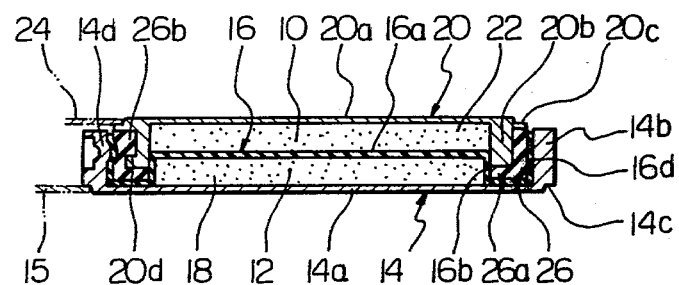

United States Patent [19]

Nakayama

[11] 4,224,387
[45] Sep. 23, 1980

[54] BATTERY CONSTRUCTION
[75] Inventor: Yasuaki Nakayama, Hanno, Japan
[73] Assignee: Citizen Watch Co., Ltd., Tokyo, Japan
[21] Appl. No.: 961,782
[22] Filed: Nov. 17, 1978
[30] Foreign Application Priority Data
Nov. 21, 1977 [JP] Japan ............................ 52/156461[U]
[51] Int. Cl.$^2$ .............................................. H01M 2/18
[52] U.S. Cl. ...................................... 429/133; 429/174
[58] Field of Search ......................... 429/133, 162, 174
[56] References Cited
U.S. PATENT DOCUMENTS
4,121,021  10/1978  Ogawa et al. ......................... 429/162

FOREIGN PATENT DOCUMENTS
2445305  3/1975  Fed. Rep. of Germany ............ 429/174

Primary Examiner—Donald L. Walton
Attorney, Agent, or Firm—Jordan and Hamburg

[57] ABSTRACT

A battery construction having a cup member and a cap member fixedly held by the cup member. A cup-shaped separator is disposed between the cup member and the cap member, to provide first and second compartments to accommodate a positive active material and a negative active material. The cup-shaped separator has a radial wall intervening between the first and second compartments, an axial wall integral with the radial wall, and a flange portion compressed between a sealing member and the cup member.

7 Claims, 2 Drawing Figures

BATTERY CONSTRUCTION

This invention relates generally to miniaturized batteries for use in electronic timepieces and other small size portable electronic devices, and more particularly to an improvement over the construction of such batteries.

In recent years, small size batteries of larger capacity than previously were available have been increasingly developed, with the development of electronic timepieces and other small size portable electronic devices. Of these, alkali type cells such as mercury or silver oxide batteries using potassium hydroxide (KOH) or sodium hydroxide (NaOH) as an electrolyte are well known in the art. Most recently, other types of cells, such as a lithium battery using an organic electrolyte, have also become known in the art. These batteries usually have a chamber to accommodate a positive active material, a negative active material and a separator, etc. This chamber will be referred to as the battery chamber hereinafter. The battery chamber is generally formed in a cylindrical shape, the cell having a top cap and a bottom cup, with annular flanges or shoulders at their outer peripheries so that the battery chamber can be easily sealed by crimping operations at the time of battery assembly, to prevent leakage of the electrolyte from the battery chamber. This sealing ensures long battery life. In conventional batteries of these types such as disclosed in U.S. Pat. No. 3,880,672, a mix sleeve is disposed in a cup at a middle part thereof, and a separator is disposed on and supported by the mix sleeve, whereupon a sealing member is disposed on the separator between a flange of the cup and a flange of a cap. With this construction, it is extremely difficult to decrease the thickness of the battery due to provision of the mix sleeve and the sealing member in an axial direction of the battery.

It is, therefore, an object of the present invention to provide a new and improved battery construction for use in electronic timepieces and other portable electronic devices.

It is another object of the present invention to provide a new and improved battery construction which is simple in construction and easy to manufacture.

It is another object of the present invention to provide an improved construction for a battery construction by which a battery has a minimum thickness.

Figure 2:
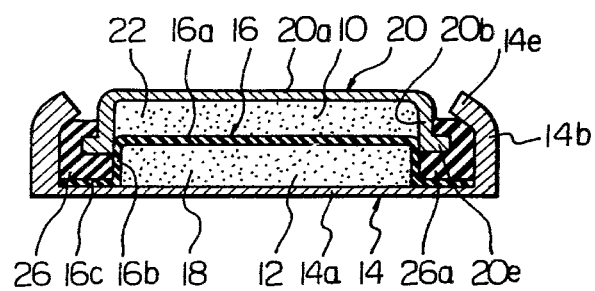

These and other objects, features and advantages of the present invention will become more apparent from the following description when taken in conjunction with the accompanying drawings, in which:

FIG. 1 is a cross-sectional view of a preferred embodiment of a battery construction according to the present invention; and FIG. 2 is a cross-sectional view of another preferred embodiment of the battery construction according to the present invention;

Referring now to FIG. 1, there is shown in cross section a battery construction embodying the present invention. The battery construction has a negative active material 10 and a positive active material 12. A cup member 14 has a radial wall 14a and an axial wall 14b provided at an outer periphery of the radial wall 14a. A cup-shaped separator 16 is disposed in the cup member 14 and has a radial wall 16a spaced from the radial wall 14a of the cup member 14 to define therebetween a first compartment 18 to accommodate therein the positive active material 12. The separator 16 also has an axial wall 16b formed around an outer periphery of the radial wall 16a, and a flange portion 16c radially outwardly extending from the axial wall 16b. The flange portion engages with the radial wall 14a of the cup member 14. An annular shoulder 14c is axially displaced from the radial wall 14a of the cup member 14 and engages with a positive terminal 15. A cap member 20 is disposed in the cup member 14 and fixedly held thereby. The cap member 20 has a radial wall 20a spaced from the radial wall 16a of the separator 16 to define therebetween a second compartment 22 to accommodate therein the negative active material 10. The cap member 20 also has an axial wall 20b formed around an outer periphery of the radial wall 20a, and an annular shoulder 20c axially displaced from the radial wall 20a of the cap member 20 to engage with a negative terminal 24. A packing or sealing member 26 is fixedly retained between the cup member 14 and the cap member 20. The sealing member 26 includes a radial flange portion 26a compressing the radial wall 16c of the separator 16 toward the radial wall 14a of the cup member 14. With the construction mentioned above, each of the axial walls 14b and 26b has a larger thickness than the radial walls 14 and 20a. Although the separator 16 also has a second axial wall 16d disposed between the sealing member 26 and the axial wall 14b of the cup member 14, the axial wall 16d may be omitted, if desired.

Assembling the battery construction by pressing the cup member 14 and the cap member 20 together in the axial direction provides a sufficient seal so that there will be no leakage of electrolyte from within the battery. Stability is assured since the diametrically directed compression seal between parts of the battery is decided by the dimensions of the inner circumference of the axial wall 14b of the cup member 14 and the outer circumference of the axial wall 20b of the cap member 20, the thickness of the separator 16 and the thickness of packing 26, all of which can be easily dealt with to eliminate any machining errors. The axial wall 20b of the cap member 20 is formed at its three equally spaced positions with recessed portions 20d. Designated at 14d is a projection located at three equally spaced apart points along the circumference of the axial wall 14b of the cup member 14. These projections are formed by means of a hammer following a step in which the thickness of the assembled battery is reduced by a milling cutter. The projections 14a prevent the cap member 20 from being forced open by a build-up in internal gas pressure as discharge of the battery progresses. The projections 26b on packing 26 also play a similar role. Lead plates constituting the electrical terminals 15 and 24 retain the battery and provide the electrical connection to the positive cup member and negative cap member by being held in abutting contact with respective stepped portions 14c and 20c in the form of annular shoulders provided on the outer circumference of the cup member 14 and the cap member 20. It is therefore possible to reduce the thickness of the battery portion including the portions at which the electrical connections to the battery are provided.

FIG. 2 shows another preferred embodiment of a battery construction according to the present invention, with like or corresponding component parts bearing the same reference numerals as those used in FIG. 1. The embodiment of FIG. 2 is identical to the structure shown in FIG. 1 except that the cap member 20 has an annular flange portion axially extending radially outward from the axial wall 20b of the cap member 20. The annular flange portion 20e is compressed by the sealing member 26 by the action of a flange portion 14e of the cup member 14 crimped inward during assembly of the battery construction.

In accordance with the present invention as described above, the radial walls of the cup member and the cap member are thin so that a large amount of positive and negative active materials can be introduced into the first and second compartments, thus providing a battery with a large discharge capacity despite its small size and thin configuration. Moreover, the stable sealing structure practically eliminates the danger of leakage. The battery construction of the present invention is therefore particularly effective when employed in small electronic devices such as electronic timepieces.

While the present invention has been shown and described with reference to particular embodiments, it should be noted that various other changes or modifications may be made without departing from the scope of the present invention. For example, the first compartment 18 may be filled with a negative active material instead of a positive active material, and the second compartment 22 may be filled with a positive active material instead of a negative active material.

What is claimed is:

1. A battery construction having a negative active material and a positive active material, comprising:
    a cup member having a radial wall and an axial wall provided at an outer periphery of the radial wall;
    a cup-shaped separator disposed in said cup member and having a radial wall spaced from the radial wall of said cup member to define therebetween a first compartment to accommodate one of said negative active material and said positive active material, an axial wall formed around an outer periphery of the radial wall of said separator, and a flange portion radially outwardly extending from the axial wall of said separator, said flange portion engaging with the radial wall of said cup member;
    a cap member disposed in said cup member and fixedly held thereby, said cap member having a radial wall spaced from the radial wall of said separator to define therebetween a second compartment to accommodate therein another one of said negative active material and said positive active material, an axial wall formed around an outer periphery of the radial wall of said cap member; and
    a sealing member fixedly retained between said cup member and said cap member, said sealing member including a radial flange portion compressing the radial wall of said separator toward the radial wall of said cup member;
    wherein each of the axial walls of said cup member and said cap member is thicker than each of the radial walls of said cup member and said cap member.

2. A battery construction according to claim 1, in which the radial wall of said cap member has its outer periphery formed at its circumferentially spaced positions with recessed portions with which said sealing member engages.

3. A battery construction according to claim 1, in which the axial wall of said cup member has at least one inwardly extending porjections to compress said sealing member toward the outer periphery of the radial wall of said cap member.

4. A battery construction according to claim 1, in which said cup member has a shoulder portion axially displaced from the radial wall of said cup member.

5. A battery construction according to claim 1, in which said cap member has a shoulder portion axially displaced from the radial wall of said cap member.

6. A battery construction according to claim 1, in which said cap member also has a radially outwardly extending annular shoulder fixedly holding said sealing member.

7. A battery construction according to claim 1, in which said cap member also has a radially extending flange portion and said cup member has a flange portion which is crimped inward during assembly to compress said sealing member between said flange portion of said cup member and said radially extending flange portion.

* * * * *